US009588770B2

(12) United States Patent
Burgess et al.

(10) Patent No.: US 9,588,770 B2
(45) Date of Patent: Mar. 7, 2017

(54) DYNAMIC RENAME BASED REGISTER RECONFIGURATION OF A VECTOR REGISTER FILE

(71) Applicants: Bradley Gene Burgess, Austin, TX (US); Ashraf Ahmed, Austin, TX (US); Ravi Iyengar, Austin, TX (US)

(72) Inventors: Bradley Gene Burgess, Austin, TX (US); Ashraf Ahmed, Austin, TX (US); Ravi Iyengar, Austin, TX (US)

(73) Assignee: Samsung Electronics Co., LTD., Suwon-si (KR)

( * ) Notice: Subject to any disclaimer, the term of this patent is extended or adjusted under 35 U.S.C. 154(b) by 728 days.

(21) Appl. No.: 13/837,213

(22) Filed: Mar. 15, 2013

(65) Prior Publication Data

US 2014/0281415 A1    Sep. 18, 2014

(51) Int. Cl.
*G06F 9/30* (2006.01)
*G06F 9/40* (2006.01)
*G06F 9/38* (2006.01)

(52) U.S. Cl.
CPC ...... *G06F 9/30098* (2013.01); *G06F 9/30112* (2013.01); *G06F 9/384* (2013.01)

(58) Field of Classification Search
CPC .. G06F 9/30098; G06F 9/30112; G06F 9/384; G06F 9/3016; G06F 9/3842
USPC ......................................................... 712/217
See application file for complete search history.

(56) References Cited

U.S. PATENT DOCUMENTS

| | | |
|---|---|---|
| 5,481,683 A | 1/1996 | Karim |
| 6,609,189 B1 | 8/2003 | Kuszmaul et al. |
| 7,725,439 B2 | 5/2010 | Doney |
| 7,809,932 B1 * | 10/2010 | Barry .................. G06F 9/30145 712/229 |
| 8,250,346 B2 | 8/2012 | Hardage |
| 2008/0077782 A1 | 3/2008 | Lataille et al. |
| 2010/0205409 A1 | 8/2010 | Zhu et al. |
| 2010/0312993 A1 | 12/2010 | I et al. |
| 2011/0010528 A1 | 1/2011 | Tagata |
| 2011/0238962 A1 | 9/2011 | Cain, III et al. |
| 2012/0124337 A1 * | 5/2012 | Hardage ............. G06F 9/30112 712/208 |

* cited by examiner

*Primary Examiner* — Chun-Kuan Lee
(74) *Attorney, Agent, or Firm* — Sughrue Mion, PLLC (57) ABSTRACT

Reconfiguring a register file using a rename table having a plurality of fields that indicate fracture information about a source register of an instruction for instructions which have narrow to wide dependencies.

22 Claims, 8 Drawing Sheets

| Q0 Valid | D1 Valid | D0 Valid | D1 Lane | S3 Lane | S2 Lane | S1 Lane | S3 Entry# | S2 Entry# | S1 Entry# | S0 Entry# |
|---|---|---|---|---|---|---|---|---|---|---|

FIG. 3B

| Dest | Q0 Valid | D1 Valid | D1 Lane | D1 Valid | S3 Lane | S2 Lane | S1 Lane | S3 Entry# | S2 Entry# | S1 Entry# | S0 Entry# |
|---|---|---|---|---|---|---|---|---|---|---|---|
| Single0 | 0 |  |  | 0 |  |  |  |  |  |  | PRF Entry# |
| Single1 | 0 |  |  | 0 |  |  | 0 |  |  | PRF Entry# |  |
| Single2 | 0 | 0 |  |  |  | 00 |  |  | PRF Entry# |  |  |
| Single3 | 0 | 0 |  |  | 00 |  |  | PRF Entry# |  |  |  |
| Double0 | 0 |  |  | 1 |  |  | 1 |  |  | PRF Entry# | PRF Entry# |
| Double1 | 0 | 1 | 0 |  | 01 | 00 |  | PRF Entry# | PRF Entry# |  |  |
| Quad | 1 | 1 | 1 | 1 | 11 | 10 | 1 | PRF Entry# | PRF Entry# | PRF Entry# | PRF Entry# |

FIG. 3C

| | Fields Needed (based on Register Range) Note: In ARMv7 Single only map onto D0-D15/Q0-Q7, and Q16-Q31 do not exist | | | | | | | | | | |
|---|---|---|---|---|---|---|---|---|---|---|---|
| | Q0 Valid | D1 Valid | D1 Lane | D1 Valid | S3 Lane | S2 Lane | S1 Lane | S3 Entry# | S2 Entry# | S1 Entry# | S0 Entry# |
| Q0-Q7 | x | x | x | x | x | x | x | x | x | x | x |
| Q8-Q15 | x | x | x | x |  |  |  |  | x |  | x |
| Q16-Q31 | x |  |  |  |  |  |  |  |  |  | x |

FIG. 3D

| | | | | | | | | | Q31 Rtag [6:0] | Entry31 (7 bits) |
|---|---|---|---|---|---|---|---|---|---|---|
| | | | | . | | | | | . | . |
| | | | | . | | | | | | |
| | | | | | | | | | Q17 Rtag [6:0] | Entry17 (7 bits) |
| | | | | | | | | | Q16 Rtag [6:0] | Entry16 (7 bits) |
| | D31 Lane [1] | | Q15 Valid | | | D31 Rtag [6:0] | | D30 Rtag [6:0] | | Entry15 (16 bits) |
| | | | | . | | | | | . | . |
| | | | | . | | | | | | |
| | D19 Lane [1] | | Q9 Valid | | | D19 Rtag [6:0] | | D18 Rtag [6:0] | | Entry9 (16 bits) |
| | D17 Lane [1] | | Q8 Valid | | | D17 Rtag [6:0] | | D16 Rtag [6:0] | | Entry8 (16 bits) |
| S31 Lane [1:0] | S30 Lane [1] | S29 Lane [0] | Q7 Valid | D15 Valid | D14 Valid | S31 Rtag [6:0] | S30 Rtag [6:0] | S29 Rtag [6:0] | S28 Rtag [6:0] | Entry7 (35 bits) |
| | | | | . | | | | | . | . |
| | | | | . | | | | | | |
| S7 Lane [1:0] | S6 Lane [1] | S5 Lane [0] | Q1 Valid | D3 Valid | D2 Valid | S7 Rtag [6:0] | S6 Rtag [6:0] | S5 Rtag [6:0] | S4 Rtag [6:0] | Entry1 (35 bits) |
| S3 Lane [1:0] | S2 Lane [1] | S1 Lane [0] | Q0 Valid | D1 Valid | D0 Valid | S3 Rtag [6:0] | S2 Rtag [6:0] | S1 Rtag [6:0] | S0 Rtag [6:0] | Entry0 (35 bits) |

Fracture is detected, µOP4 is NOT accepted, Fix-up Machine is activated, and Decode is stalled.

FIG. 5A

1. Fix-up μOP1 -
   Read S0, S1,
   and Write D0
   (Available VRF
   Tag = 32)

Read and Write Entry0 ⟶

| | VRF Rename Table | | | | | | Entry31 |
|---|---|---|---|---|---|---|---|
| Q0 Valid | D1 Valid | D0 Valid | S3 Rtag | S2 Rtag | S1 Rtag | S0 Rtag | . . |
| 0 | | 1 | 35 | 34 | 36 | 36 | Entry0 |

FIG. 5B

2. Fix-up μOP2 -
   Read S2, S3,
   and Write D1
   (Available VRF
   Tag = 37)

Read and Write Entry0 ⟶

| | VRF Rename Table | | | | | | Entry31 |
|---|---|---|---|---|---|---|---|
| Q0 Valid | D1 Valid | D0 Valid | S3 Rtag | S2 Rtag | S1 Rtag | S0 Rtag | . . |
| 0 | 1 | | 37 | 37 | 36 | 36 | Entry0 |

FIG. 5C

3. Fix-up μOP3 -
   Read D0, D1,
   and Write Q0
   (Available VRF
   Tag = 38)

Read and Write Entry0 ⟶

| | VRF Rename Table | | | | | | Entry31 |
|---|---|---|---|---|---|---|---|
| Q0 Valid | D1 Valid | D0 Valid | S3 Rtag | S2 Rtag | S1 Rtag | S0 Rtag | . . |
| 1 | 1 | 1 | 38 | 38 | 38 | 38 | Entry0 |

Fix-up is complete, and decode stall is removed.

FIG. 5D

4. μOP4 is replayed
   by Decode -
   μOP4 - read Q0

Read Entry0 ⟶

| | VRF Rename Table | | | | | | Entry31 |
|---|---|---|---|---|---|---|---|
| Q0 Valid | D1 Valid | D0 Valid | S3 Rtag | S2 Rtag | S1 Rtag | S0 Rtag | . . |
| 1 | 1 | 1 | 38 | 38 | 38 | 38 | Entry0 |

Q0 is now available as a Quad at VRF #38, and this μOP is successfully renamed.

FIG. 6

DYNAMIC RENAME BASED REGISTER RECONFIGURATION OF A VECTOR REGISTER FILE

BACKGROUND

1. Field

Methods and apparatuses consistent with exemplary embodiments of the inventive concept relate to determining fracture of a register file and reconfiguring a register file by fixing up the fracture in a processor.

2. Description of the Related Art

Figure 1A:
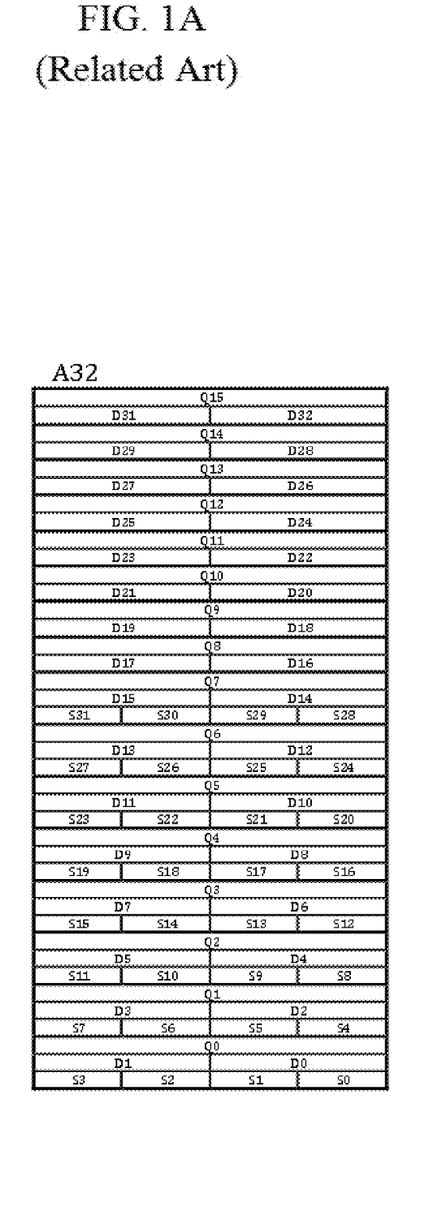
FIG. 1A illustrates a 32-bit register layout (Aarch32 layout of an ARMv7 processor)

For example, as shown in FIG. 1A, a layout of architectural registers of the vector register file (VRF) in Aarch32 layout of an ARMv7 processor (ARMv7 is a trademark of ARM, Ltd., Cambridge, U. K.) is configured such that it introduces potential "narrow-to-wide" dependencies among source and destination registers. The narrow-to-wide dependency represents a situation where reading a large size value could result in reading of multiple smaller size registers. For example, reading a quad word could result in reading multiple single registers or double registers if producers of the quad word were multiple single words or double words. Similarly, reading a double word could result in reading two single registers.

Figure 1B:
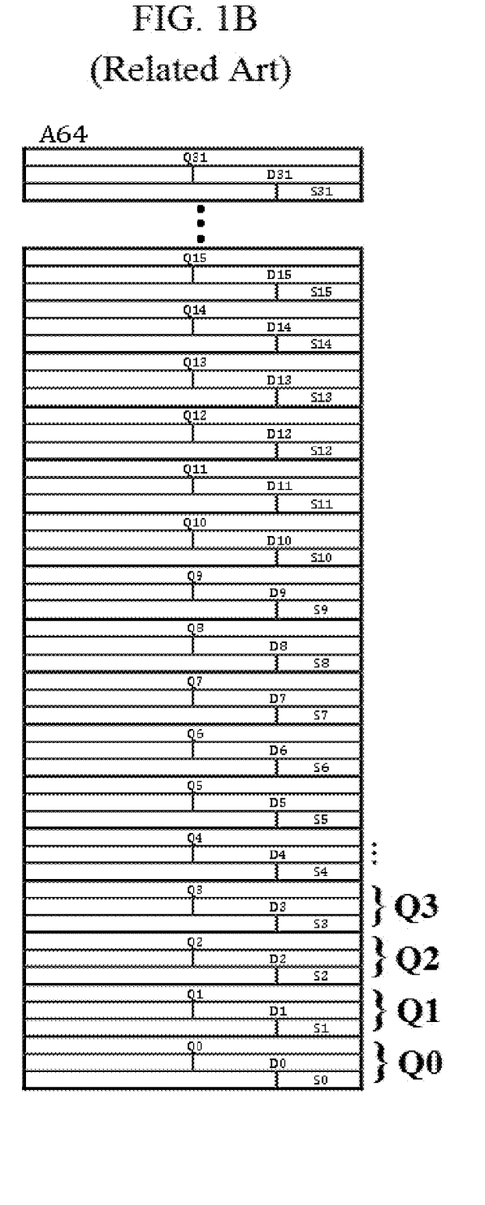
FIG. 1B illustrates a 64-bit register layout (Aarch64 layout of an ARMv8 processor)

As shown in FIG. 1A, in the 32-bit register layout (Aarch32 layout of an ARMv7 processor), a quad register (e.g., Q15) maps to two double registers (e.g., D31 and D32), and a double register (e.g., D15) maps to two single registers (e.g., S31 and S30). As shown in FIG. 1B, in the 64-bit register layout (Aarch64 layout of an ARMv8 processor), each entry (Q0, Q1, Q2, Q3 . . . ) maps to a single register regardless of the size.

In the above examples, an instruction with one quad register source could require up to four single register sources or a combination of single register sources and double register sources. Therefore, if there are multiple quad register sources in an instruction, the true number of register sources required can be much greater, and therefore, consumption of power and time in instruction processing is not negligible.

Handling the narrow-to-wide dependency can be very expensive in terms of area and power, and can also be a bottle neck of performance. Further, when reading a large size value (e.g., a quad word value) requires reading multiple smaller size registers, the large size source is fractured, area and power consumption in the processor is more aggravated. For example, fracturing may occur because producer instructions (as architecturally specified) only write a portion of a full architectural register and these instructions are specified by the microarchitecture to write their result into a unique physical register. As such, the value of an architectural register may be split across multiple physical registers, and thus the "fracture" represents a situation where contents of an architectural register source are split across multiple physical registers.

SUMMARY

In order to address the related art problems of narrow-to-wide dependency and fracture of registers, one or more exemplary embodiments provide methods and apparatuses for reconfiguring a register file based on a register rename table.

According to an aspect of an exemplary embodiment, there is provided a method of reconfiguring a register file, the method including providing a rename table comprising a plurality of fields; and recording, in the fields of the rename table, fracture information about a source register of an instruction, the fracture information comprising information about at least one producer of the source register.

The source register is an architectural source register of the instruction and the method may further include determining from the fracture information whether the architectural source register is fractured, wherein the architectural source register is determined to be fractured when contents of the architectural source register are split across multiple physical registers.

The fracture information may be derived from first information of an architectural source tag indicating a type of the architectural source register and second information of the architectural source tag indicating whether the architectural source register is fractured.

The method may further include: generating at least one fix-up micro-op, if it is determined that the architectural source register is fractured; and injecting the fix-up micro-op to fix up the fracture by reading two or more registers of two or more producers and writing a result of the reading to a register, having a size larger than a size of each of the registers of the two or more producers, in the register file.

The renamer may rename the fix-up micro-op.

The method may further include determining a number of the at least one fix-up micro-op based on the first information and the second information.

The first information indicates the type of the architectural source register is one of a single, double, or quad and the second information indicates the at least one producer is a single, double, or quad.

The method may further include stalling a micro-op which has not been renamed and scheduled for execution, if it is determined that the architectural source register of the micro-op is fractured.

According to an aspect of another exemplary embodiment, there is provided an instruction processing apparatus comprising a renamer which provides a rename table, wherein the renamer records, in the rename table, fracture information about a source register of an instruction, and wherein the fracture information comprises information about at least one producer of the source register.

The source register is an architectural source register of the instruction and the apparatus may further include a fracture determiner which is configured to determine, from the fracture information, whether the architectural source register is fractured, wherein the architectural source register is determined to be fractured when contents of the architectural source register are split across multiple physical registers.

The fracture information may be derived from first information of an architectural source tag indicating a type of the architectural source register and second information of the architectural source tag indicating whether the architectural source register is fractured.

The apparatus may further include a fix-up state machine which is configured to: generate at least one fix-up micro-op, if it is determined that the architectural source register is fractured; and inject the fix-up micro-op to fix up the fracture by reading two or more registers of two or more producers and writing a result of the reading to a register, having a size larger than a size of each of the registers of the two or more producers, in the register file.

The first information indicates the type of the architectural source register is one of a single, double, or quad fix-up state machine may determine a number of the at least one fix-up micro-op based on the first information and the second information.

The first information indicates the type of the architectural source register is one of a single, double, or quad and the second information indicates the at least one producer is a single, double, or quad.

The fix-up state machine may stall a micro-op which has not been renamed and scheduled for execution, if it is determined that the source register of the micro-op is fractured.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Exemplary embodiments will be described in details with reference to accompanying drawings so as to be easily realized by a person having ordinary skills in the art. The inventive concept may be embodied in various forms without being limited to the exemplary embodiments set forth herein. Descriptions and illustration of well-known parts may be omitted for clarity, and like reference numerals refer to like elements throughout.

The narrow-to-wide (NTW) dependency resulting in fractured register sources for an architectural layout, as shown in FIG. 1A, can be addressed using various approaches. For example, the fractured original architectural source can be split into multiple physical register sources or a read-modify-write approach may be used to perform register merging. Both of these approaches have drawbacks, as the source splitting approach may result in an increased number of sources, thereby resulting in storing more source tags and potentially more register file read ports and rename table read ports, while the read-modify-write approach may degrade performance and increase power consumption.

Figure 2:
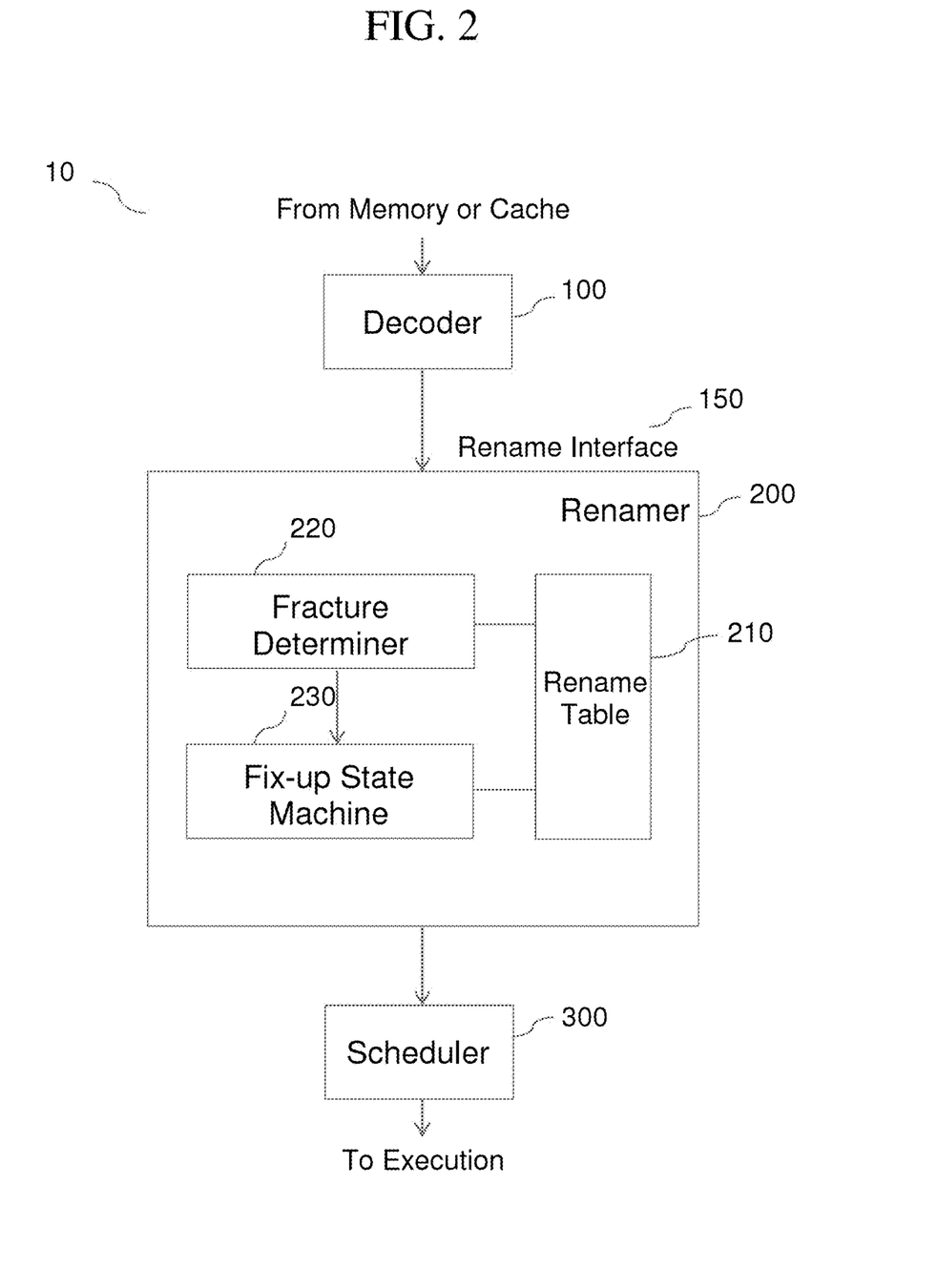
FIG. 2 illustrates a block diagram illustrating a portion of a processor 10 according to an exemplary embodiment.

FIG. 2 is a block diagram illustrating a portion of a processor 10 according to an exemplary embodiment. The processor 10 includes a decoder 100, a renamer 200 and a scheduler 300 to process instructions fetched from a memory or cache (not shown). The renamer includes a rename table 210, a fracture determiner 220 and a fix-up state machine 230. The architecture illustrated in FIG. 2 may apply to various types of processor or data processing unit including a multi-core processor.

In FIG. 2, the decoder 100 decodes instructions fetched from a memory (not shown) into lower level micro-operations (micro-ops, or instructions). Thus, a stream of instructions is mapped onto a stream of micro-ops. The decoded micro-ops fields may include an operational code specifying an action to perform (e.g. add, multiply, load, store, and the like), source operands indicating the architectural register addresses at which the data is held and a destination operand indicating an architectural register address at which the data sinks. The decoded micro-ops are sent to the renamer 200 through a rename interface 150. In the renamer 200, the architectural registers of the micro-ops are renamed and checked for dependencies before being sent for execution scheduling at the scheduler 300. The renamer 200 serves to rename architectural registers to physical registers within a register file using the rename table 210 in which information about the registers of the micro-ops is recorded. The rename table 210 is depicted as being included in the renamer 200 according to the present embodiment. However, the rename table may be stored in another part of the processor 10. Register renaming is performed to avoid write-after-read and write-after-write data hazards in an out-of-order execution of micro-ops. The architectural registers are registers specified within an instruction in a programmer's view of architecture of a processor.

In the renamer 200, the fracture determiner 220 is provided to determine whether architectural source registers of a micro-op are fractured and need to be fixed-up by analyzing source type information received from the decoder 100 and fracture information from the rename table 210. For a micro-op with a larger size source value, if producers of the micro-op are smaller size (e.g. single) registers, then the large source value is considered to be fractured in the physical register file. For example, if producers of the a quad value are single or double sources, such that the contents are split across multiple physical registers, then the source value is fractured in the physical register file. The fix-up state machine 230 fixes up the fracture determined by the fracture determiner 220 using fix-up micro-ops when the fracture is determined to exist for a given architectural register source in the register file. Detailed operations of the fracture determiner 220 and the fix-up state machine 230 are described later.

Figure 3A:
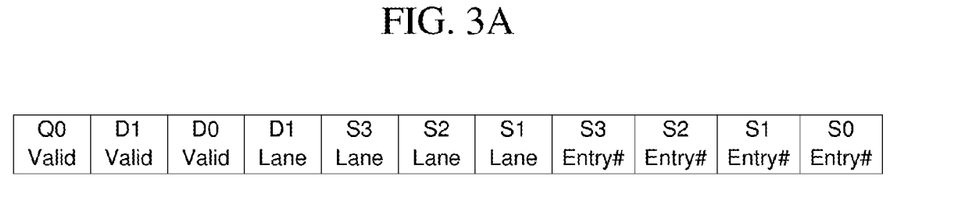
FIG. 3A illustrates an entry of a rename table in the Aarch32 layout of an ARMv7 processor, according to an exemplary embodiment.

FIG. 3A illustrates an entry of a rename table with respect to the register Q0, D0, D1, S0, S1, S2 and S3 in the Aarch32 layout of an ARMv7 processor, as shown in FIG. 1A, according to an exemplary embodiment. The rename table described here may be the same as the rename table 210 used in the renamer 200 of the processor 10 as shown in FIG. 2, and thus, the rename table is considered as the same as the rename table 210 herebelow. The rename table will be described in detail in reference to FIGS. 3B-3D. The renamer 200 renames each destination register of a micro-op decoded out from the decoder 100 and assigns a new entry for each destination register in the physical register file (PRF) regardless of the size of the destination register. In FIG. 3A, the PRF entry is 128 bits wide and the rename table allocates four single register entry fields (S0 Entry# to S3 Entry#), each of which has a size of 32 bits. Results of the register entries are always right aligned in the PRF entry. This rename table entry structure works cleanly in the Aarch64 layout of an ARMv8 processor and also works in the Aarch32 layout of an ARMv7 processor with a few additional bits of information stored in the rename table. The Aarch32 layout of the ARMv7 processor and Aarch64 layout of the ARMv8 processor are merely exemplary, and the rename table entry structure is applicable to other architectures of similar layouts. The additional bits of information are stored as three "valids information fields" and three "lane information fields." The information fields, such as the valids information fields, store whether the last write is by a single (32), double (64), or quad (128) word. The lane information fields store read lane information, i.e., how data needs to be aligned when the data is read out from registers. The information, such as the information in the valids information fields, recorded in the rename table is referred to as "fracture" information, which indicates whether there is fracture in a register file, as will be described later.

Figure 3B:
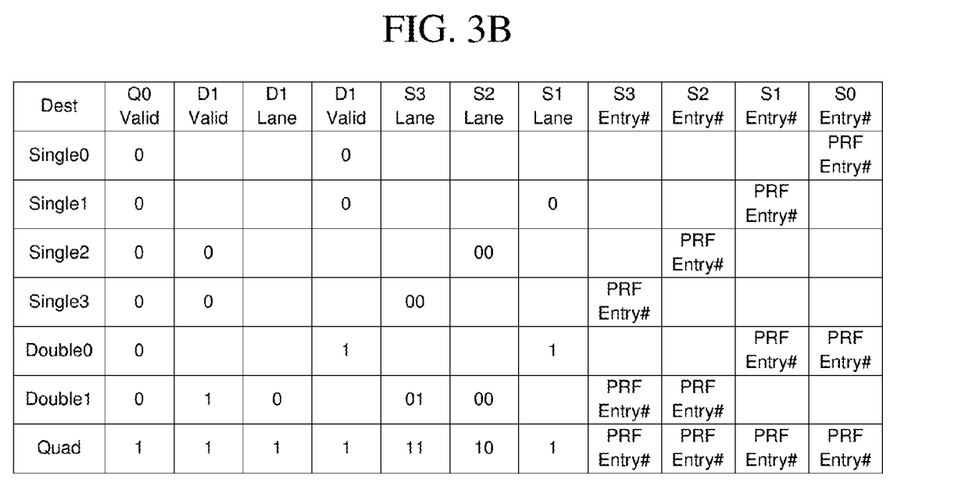
FIG. 3B illustrates updated fields of the rename table, according to an exemplary embodiment.

FIG. 3B illustrates which fields of the rename table are updated when registers S0-S3 are renamed, according to an exemplary embodiment. As one or more of the single registers S0-S3 are mapped to one or more physical register file entry numbers (PRF Entry#), a corresponding information field(s) are updated.

Figure 3C:
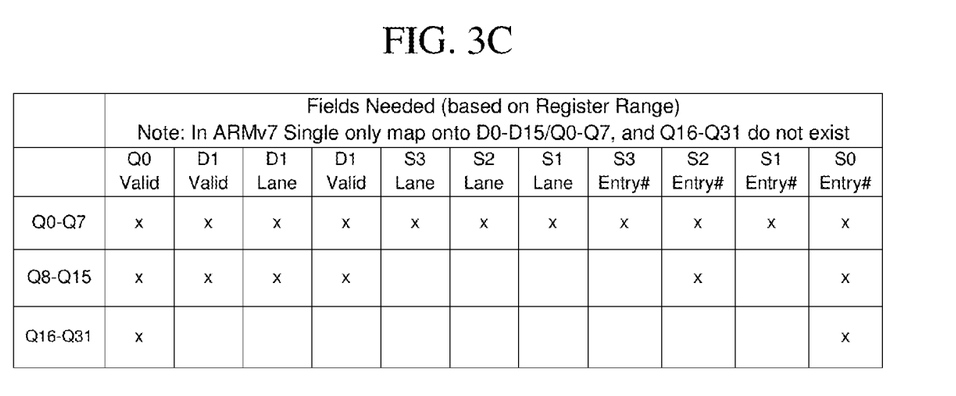
FIG. 3C shows fields needed for quad destination registers in the rename table, according to an exemplary embodiment.

FIG. 3C shows fields needed for the quad destination registers in the rename table, according to an exemplary embodiment. Not all the entries in the rename table need to store all information fields. As shown in FIG. 1A, for the Aarch32 layout of an ARMv7 processor, quad registers Q0-Q15 map onto double registers. However, for only half of them, namely Q0-Q7, each double register further maps into two single registers. Therefore, in order to map the rename table using the Aarch32 layout of an ARMv7 processor according to the present embodiment, single registers only need to map to D0-D15/Q0-Q7 and double registers only need to map onto Q0-Q15, and Q16-Q31 do not exist.

Figure 3D:
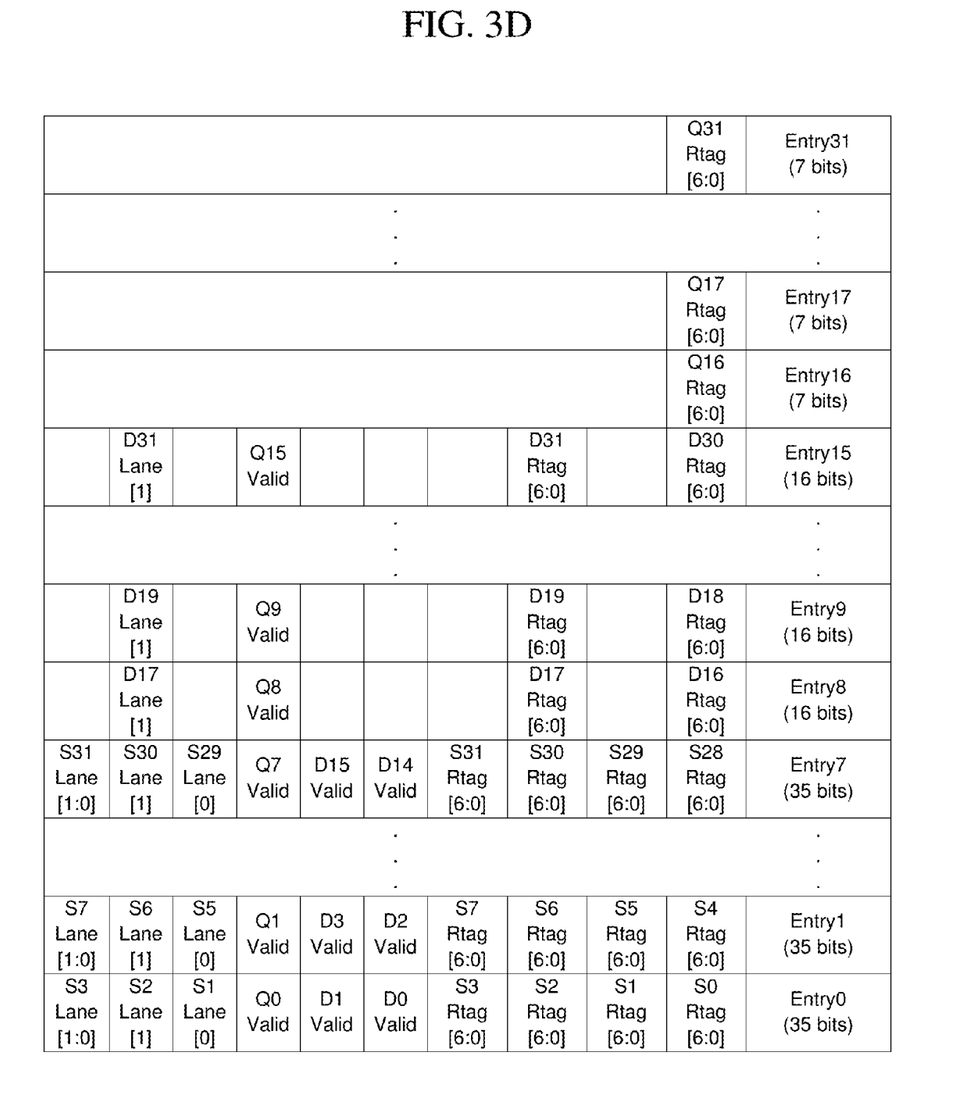
FIG. 3D illustrates all rename table entries and a size of field information in the rename table for the Aarch32 layout of an ARMv7 processor, according to an exemplary embodiment.

FIG. 3D illustrates all rename table entries and the size of field information in the rename table for the Aarch32 layout of an ARMv7 processor, according to an exemplary embodiment. In FIG. 3D, a table entry number 0 (Entry0) corresponds to the table entry shown in FIGS. 3A-3C. Each of single, double or quad registers is mapped to a physical register tag (Rtag) corresponding to a PRF Entry# in FIG. 3B. For the registers corresponding to the rename table entry numbers between 0 and 7 (Entries 0-7), a quad register maps to two double registers each of which maps to two single registers. Each valids information has a size of one bit. One lane information, such as S1, has a size one bit, and two lane information, such as S2 and S3, has two bits of information therein. For the registers corresponding to the rename table entry numbers between 8 and 15 (Entries 8-15), a quad register maps to two double registers. In each of these rename table entries, only one of the two double registers has one bit lane information, such as D1. For the registers corresponding to the rename table entry numbers between 16 and 31 (Entries 16-31), no fracture information bit exists.

Figure 4A:
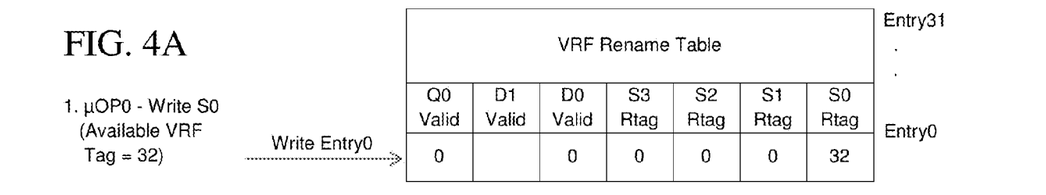
FIGS. 4A-4E illustrate a sequence of determining fracture and triggering fix-up of the fracture, according to an exemplary embodiment.
Figure 4B:
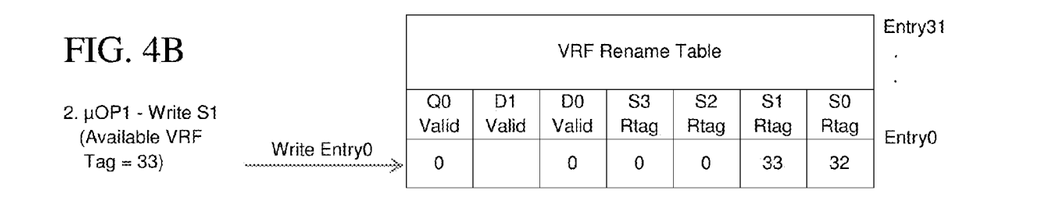
Figure 4C:
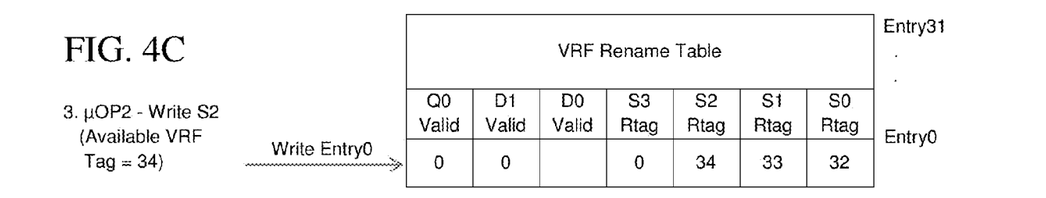
Figure 4D:
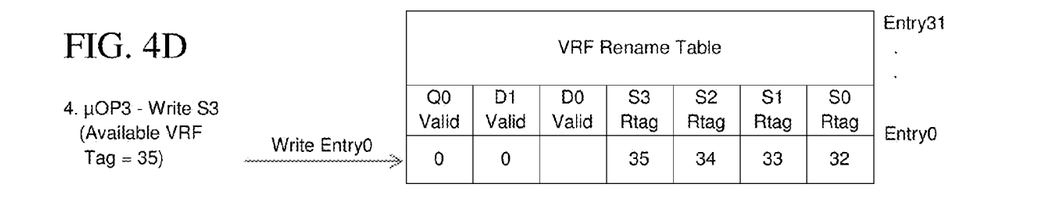

FIGS. 4A-4E illustrate a sequence of determining fracture in an architectural register source and triggering fix-up of the architectural register source fracture in the processor 10 of FIG. 2, according to an exemplary embodiment. When a first micro-op (μOP0) for writing a single register S0 mapped to an Rtag of 32 is renamed, the renamer 200 records this information of the Rtag 32 and updates the different information fields in Entry0 of the rename table, as shown in FIG. 4A. Subsequently, when a second micro-op (μOP1) for writing a single register S1 mapped to an Rtag 33 is input, the renamer 200 records this information of the Rtag 33 and also updates the information fields in the same Entry 0 of the rename table, as shown in FIG. 4B. Similarly, when a third micro-op (μOP2) and a fourth micro-op (μOP3) for writing single registers S2 and S3 mapped to Rtag34 and Rtag35, respectively, are input, the renamer 200 records this information and updates information fields in the same Entry 0 of the rename table, as shown in FIGS. 4C-4D. After the renamer 200 records the information about the registers S2 and S3, when a fifth micro-op (μOP4) for reading a quad source register Q0 is received from the decoder, it is determined by the fracture determiner 220 that the registers are fractured because the Q0, D1 and D0 bits are invalid, that is, the quad source data exist in multiple PRF entries, as shown FIG. 4E.

Figure 4E:
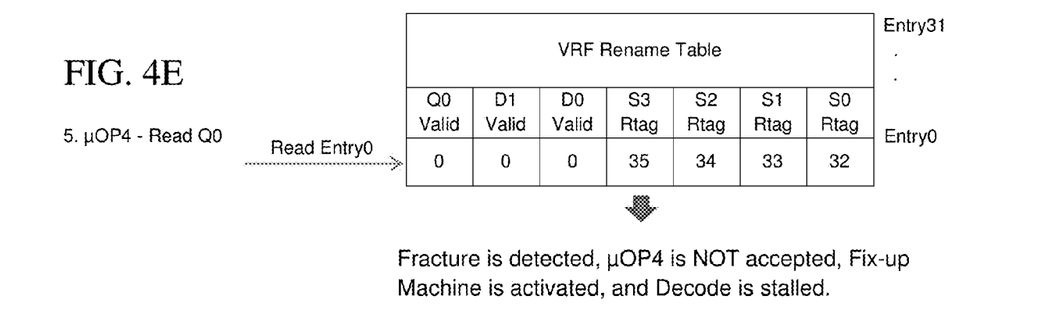

Once the fracture determiner 201 determines that there is fracture in the architectural source registers when the fifth micro-op (μOP4) is received from the decoder to the renamer 200, the micro-op (μOP4) is not accepted at the renamer 200 and the decoder 100 to the rename interface 150 is stalled. At the same time, the fix-up state machine 202 is activated to fix up the architectural source register fracture using one or more fix-up micro-ops.

Figure 5A:
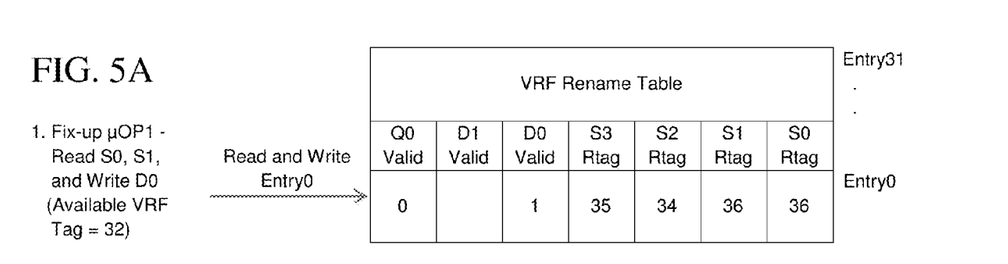
FIGS. 5A-5D illustrate a sequence of fixing up the fracture determined in the sequence shown in FIGS. 4A-4E, according to an exemplary embodiment.
Figure 5B:
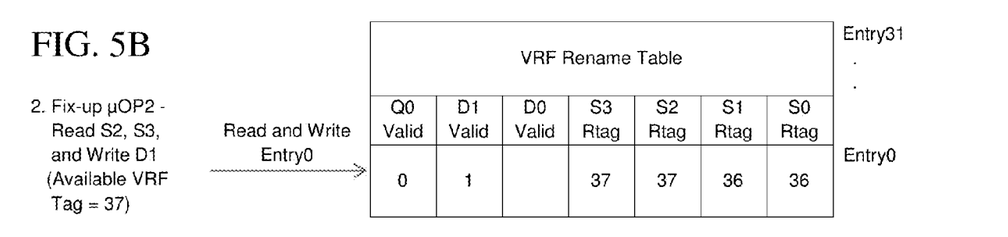
Figure 5C:
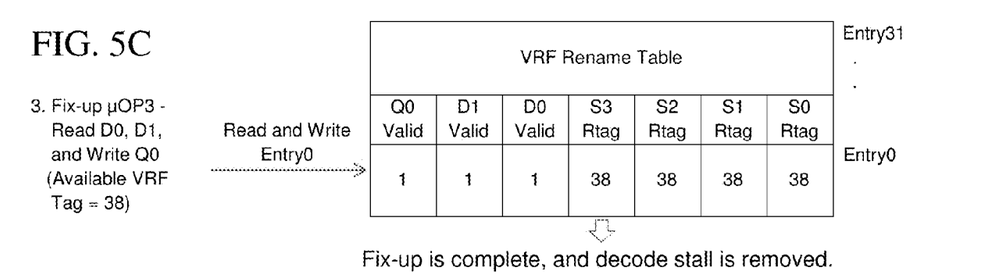
Figure 5D:
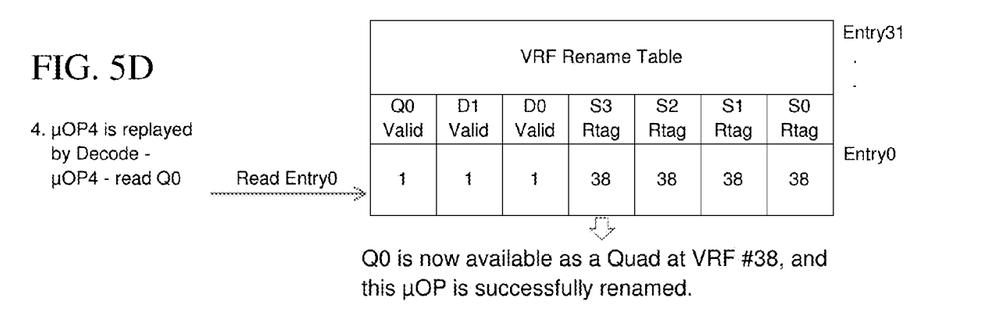

FIGS. 5A-5D illustrate a sequence of fixing up the fracture determined in the sequence shown in FIGS. 4A-4E, according to an exemplary embodiment. In FIGS. 5A-5D, micro-ops μOP1, μOP2 and μOP3 are fix-up micro-ops used to merge fractured architectural source registers. The first fix-up μOP1 reads two single registers S0 (Rtag 32) and S1 (Rtag 33), writes a result to a double register with a PRF entry 36 (Rtag 36), and updates the D0 valids information to 1, as with in FIG. 5A. By this way, the fractured two single registers from two different PRF entries are merged to the same entry. The second fix-up μOP2 reads S2 and S3, writes a result to another double register having a PRF entry 37 (Rtag 37), and updates the D1 valids information to 1, as shown in FIG. 5B. The third μOP3 reads two double registers D0 and D1, writes a result to a quad register with a PRF entry 38 (Rtag 38), and updates Q0 valids information to 1, as shown in FIG. 5C. At this point, the fix-up for one architectural register source is completed. The process will be iterated until fix-up of all architectural register sources of the fractured micro-op is completed. Once the fix-up for the fractured micro-op is completed, the fix-up state machine 230 removes the decoder stalling. The original micro-op (μOP4 in FIG. 4E) that triggered the fix-up is now allowed to go through the renamer 200 successfully, as shown in FIG. 5D.

In the above fix-up process as shown in FIGS. 5A-5D, the fix-up micro-ops use the same read ports on the rename table that regular micro-ops use in the renamer 200, and thus, no additional read ports are required for the fix-up micro-ops.

Figure 6:
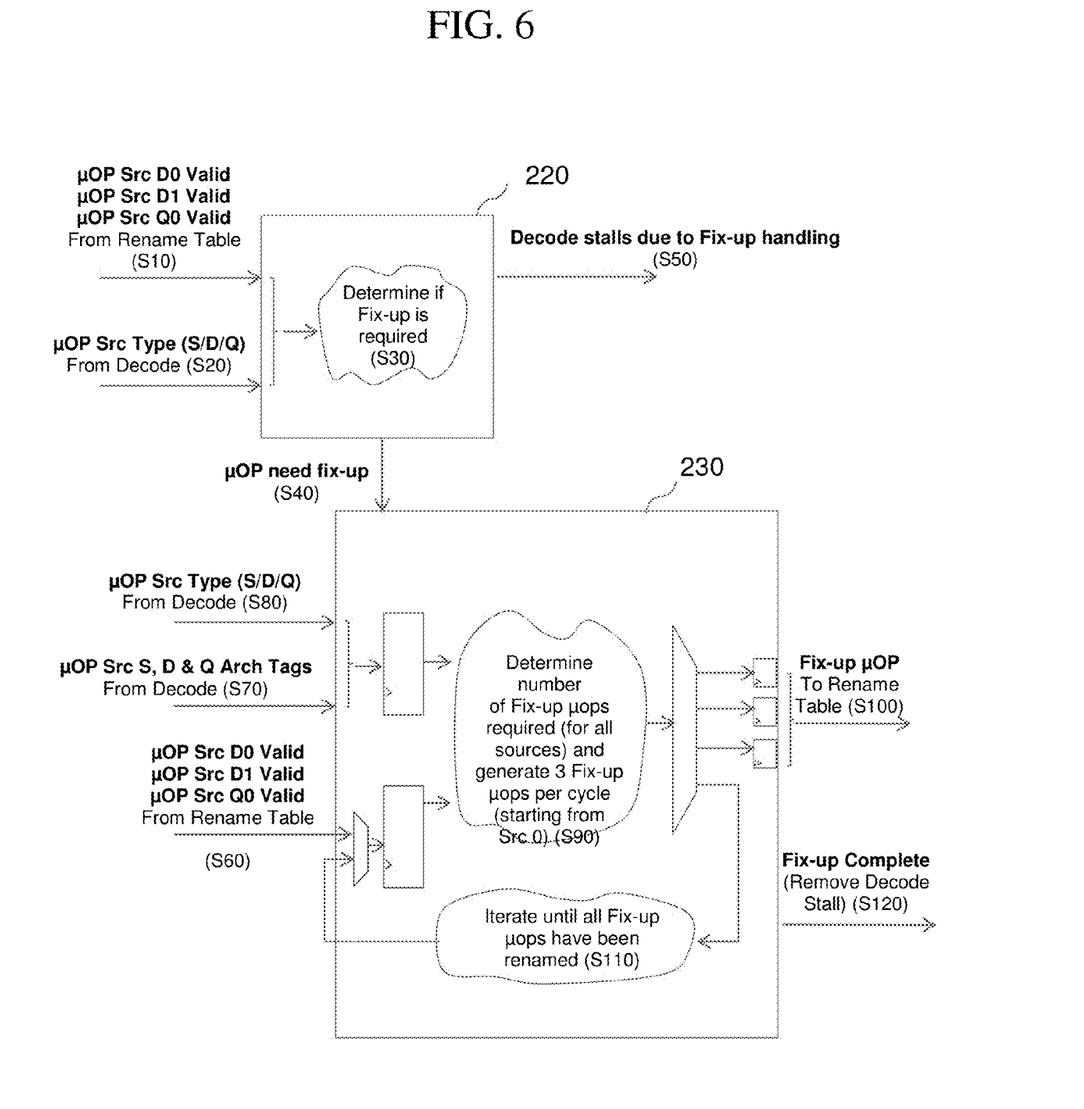
FIG. 6 illustrates a sequence of determining register fracture and generating a fix-up micro-op, according to an exemplary embodiment.

FIG. 6 illustrates a sequence of determining architectural source register fracture and generating a fix-up micro-op performed at the fracture determiner 220 and the fix-up state machine 230 of FIG. 2, according to an exemplary embodiment.

After renamed register tags (Rtags) for all micro-ops in a cycle are read from the rename table, the fracture determiner 220 determines whether a micro-op requires fix-up to handle register merging. Specifically, as shown in FIG. 6, the fracture determiner 220 receives fracture information from the rename table 210 when a micro-op enters the renamer 200 (S 10), and also receives information about types of architectural source registers in the micro-op (e.g. single, double or quad) from the decoder 100 (S20). The fracture information includes valids information about the source registers (Q0, D1 and/or D0) stored in the rename table. Based on the received information, the fracture determiner 201 determines whether the architectural source registers are fractured, that is, whether fix-up of the architectural source registers is required (S30). If an architectural source register of the micro-op is marked as existing in multiple PRF entries, then the fracture determiner 201 determines that the architectural source register of the micro-op is fractured and needs fix-up (S40).

Once it is determined that the architectural source registers are fractured, and thus, the micro-op of the architectural source registers needs fix-up (S40), the fracture determiner 220 stalls the rename interface 150 for the fractured micro-op and all younger micro-ops (S50). However, the older micro-ops in the same cycle are allowed to proceed through rename and into dispatch. Here, the younger micro-ops refer to micro-ops that are younger in program order and the older micro-ops refer to micro-ops that are older in the program order.

After it is determined that the micro-op needs fix-up at operation S40, the fix-up state machine 230 receives the fracture information, i.e., source valids information, from the rename table (S60), information about types of the source registers (single, double or quad) in the micro-op from the decoder 100 (S70) and architectural tags of the source registers from the decoder 100 (S80). Using the above information, the fix-up state machine 230 determines the number of fix-up micro-ops required for each fractured micro-op and generates the required number of fix-up micro-ops to fix up the fracture of the source registers (S90). As explained earlier, the fix-up is performed by merging smaller size registers having different physical register file entry numbers and writing data of the registers to any greater size register having another register file entry number. For example, if a source register is a quad produced by two double registers, two double registers may be merged and a result may be written to a quad register. For a double source register produced by two single results, two single registers may be merged and a result may be written to a double register. As the micro-ops are generated, these fix-up micro-ops are dispatched to the rename table to fix up the fracture by the fix-up state machine 230 (S100). Once the fix-up is completed for the fractured micro-op, the decoder stalling is removed to allow the decoder to replay the original "fractured" micro-op, which is no longer fractured and has been fixed-up. The fixed-up micro-op now successfully proceeds through the renamer and to dispatch. Determining and generating the required number of fix-up micro-ops are iterated until all fix-up micro-ops have been generated and renamed (S110). These fix-up micro-ops go through a normal register renaming process. When the fix-up is completed for the fractured micro-op, the decoder stalling is removed (S120). The iterative fix-up mechanism described is merely an exemplary embodiment of how the fix-up scheme may be performed, but other mechanisms can also be employed.

The fix-up micro-ops according to the present embodiments are helper instructions to read smaller size registers and write a larger size register. For example, the fix-up micro-ops read two single registers and write a double register, or read two double registers and write a quad register.

The number of fix-up micro-ops required depends on whether a source register is a quad or double and whether a producer of the source data is a quad, double or single. For example, in the rename table shown in FIG. 3B, if a source register is a quad Q0, and two producer doubles D1 and D0 are both valid, a single fix-up micro-op is needed to read both D1 and D0 and write to a quad register. If either one of D1 and D0 source registers is invalid, two fix-up micro-ops are needed. That is, the first fix-up micro-op is needed to read two producers S0 and S1 and write to a double register, and the second micro-op is needed to read the newly formed double register and the existing valid double register, and write to a final quad register. If both D1 and D0 are invalid, three fix-up micro-ops are needed. That is, the first micro-op reads the lower two single registers and write to a double register, the second micro-op reads the upper two singles and write another double register, and the final micro-op reads the two double registers and write to a final quad register. If the source register is a double register, a single fix-up micro-op is needed to read two single registers and write to a double register. The fix-up state machine 230 injects the required number of fix-up micro-ops to perform fix-up.

Figure 7:
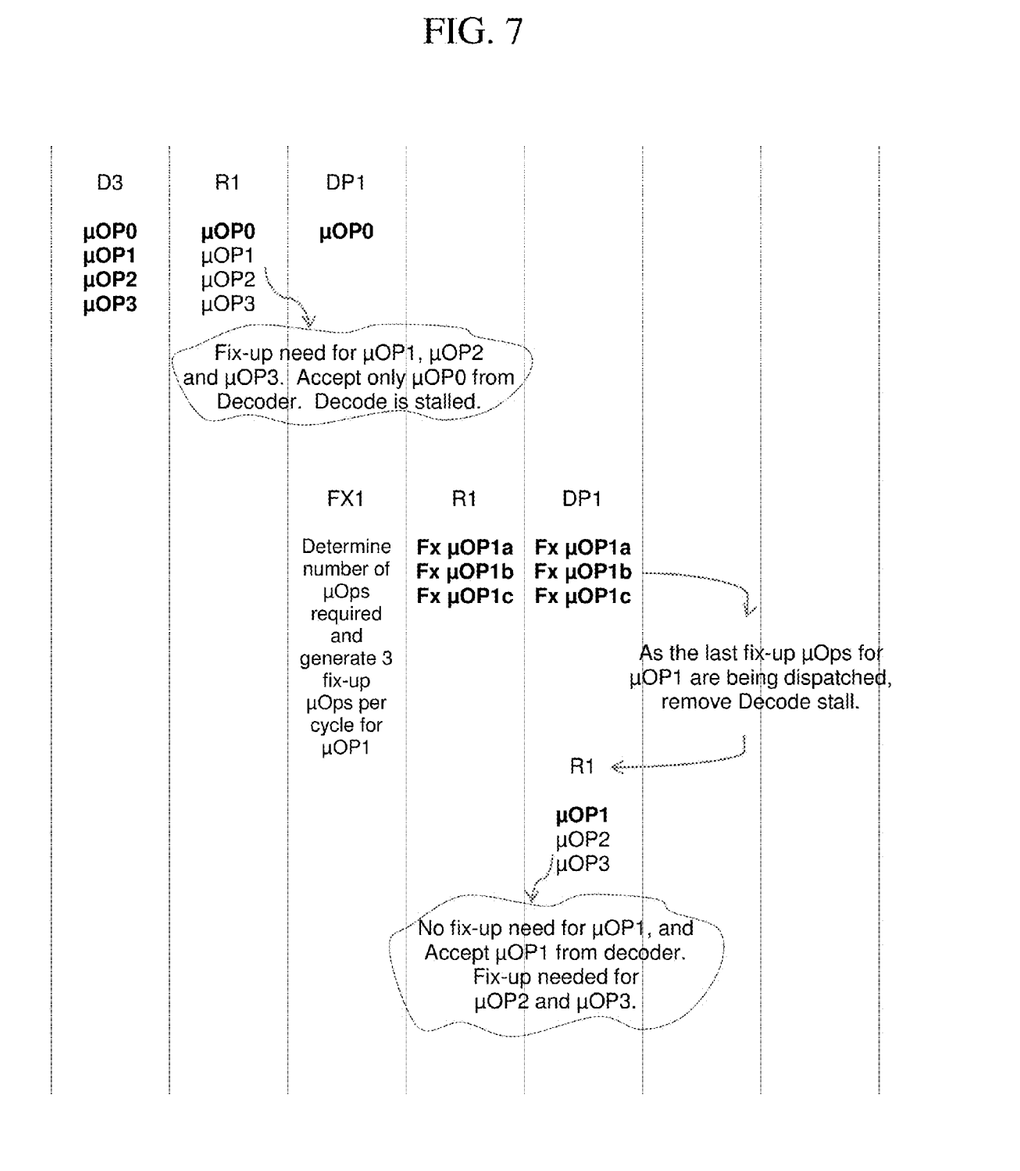
FIG. 7 illustrates a fix-up process flow in an instruction pipeline diagram, according to an exemplary embodiment.

FIG. 7 illustrates a fix-up process flow in an instruction pipeline diagram, according to an exemplary embodiment. As shown in FIG. 7, four micro-ops called μOP0, μOP1, μOP2 and μOP3 enter the renamer 200, where μOP0 is the oldest in the cycle and μOP3 is the youngest in the cycle. The fracture information about source registers of each micro-op is recorded in the rename table. By comparing the rename table and a source type of the micro-ops, a necessity of fracture fix-up is determined by the fracture determiner 230. When μOP0 enters the renamer 200, if the fracture determiner determines that there is no fracture in the source register triggering fix-up, μOP0 is dispatched for renaming. The second micro-op, μOP1, is determined as in need of a fix-up. Then the decoder is stalled and the fix-up process is initiated.

The fix-up state machine 230 determines the number of fix-up micro-ops required for the fractured micro-op and injects the required number of fix-up micro-ops. In the example of FIG. 7, the required number of fix-up micro-ops is three for fix-up of μOP1. The injected fix-up micro-ops, named as FxOP1*a*, FxOP1*b* and FxOP1*c*, help to merge the smaller size registers and write to larger size registers. As the fix-up micro-ops for μOP1 are generated, the fix-up micro-ops FxOP1*a*, FxOP1*b* and FxOP1*c* are dispatched and the stall in the decoder 100 is removed.

After finishing the fix-up of μOP1, the decoder stall is removed, the decoder replays μOP1, μOP2 and μOP3, and μOP1 is successfully renamed. The third micro-op, μOP2, is determined as in need of fix-up and the decoder 100 is stalled again. Similarly, the fix-up state machine 230 injects the number of fix-up micro-ops that is needed to fix-up μOP2 and another fix-up process starts. The fourth micro-op, μOP3, is also fixed up in a similar process. As shown in the FIG. 7, the fix-up process is a pipeline process.

It is possible that this fix-up scheme will be needed for each of the source registers in a micro-op. If there are three sources in a micro-op, then a maximum of nine fix-up micro-ops could be needed to fix up fracture in this micro-op. Among the nine fix-up micro-ops, four fix-up micro-ops can be renamed/dispatched per cycle, according to an exemplary embodiment. Renaming of subsequent micro-ops is stalled until these fix-up micro-ops are inserted. If multiple micro-ops require fix-up in the same cycle, an order of fixing up the micro-ops is determined by relative age of the micro-ops.

The renaming and fix-up scheme disclosed in the above exemplary embodiments eliminates the need for storing multiple physical source tags in a scheduler at the same time (not shown) for all cracked sources that are required for register merging. In addition, this scheme eliminates the need for additional read ports in the renamer and in the physical register file to handle register merging. Rather, the above exemplary embodiments use an area and power efficient state machine to detect and handle fix-up micro-ops for register merging. Moreover, the above exemplary embodiments do not affect instructions which do not have narrow to wide dependencies, and therefore is more efficient in terms of performance.

The above described embodiments are meant to be illustrative only and are not intended to be limiting the scope of the inventive concept. For example, the exemplary size of 128 bits for a physical register can be different sizes such as 256, 64 or 32 bits. The single register can be any bits with a smaller size such as 4, 16 or 64 bits, and accordingly, the double register can be any bits with larger sizes such as 8, 32, 64 or 128 bits, and the quad register can be bits with even larger sizes such as 16, 64 or 256 bits. In addition, the number of micro-ops per cycle described in the exemplary embodiments can be any number. Further, the rename table 210, the fracture determiner 220 and the fix-up state machine 230 do not have to be included in the renamer 200 in terms of structure, and instead, may be implemented as a separate component of the processor 10 in FIG. 2.

The teachings of the exemplary embodiments are not limited and may also be applied to all types of architectural registers where the NTW dependency exists. These and other variations, modifications, additions and improvements may fall within the scope of the inventive concept. Therefore, the scope of the inventive concept is defined not by the detailed descriptions of the exemplary embodiments but by the appended claims, and all differences within the scope will be construed as being included in the inventive concept.

What is claimed is:

1. A method of reconfiguring a vector register file, the method comprising:
    providing a rename table for renaming architectural registers of instructions to be executed to physical registers, the rename table comprising a rename table entry, and the rename table entry comprising a physical register file (PRF) entry of a plurality of register entry fields;
    recording, in the plurality of register entry fields of the PRF entry, physical register file entry numbers of destination registers to which results of decoded instructions are written;
    recording, in the rename table, fracture information of a source register of an instruction, the fracture information comprising information indicating that data of the source register is distributed across a plurality of registers associated with different physical register file entry numbers among the physical register file entry numbers recorded in the plurality of register entry fields of the PRF entry; and
    setting the different physical register file entry numbers recorded in the plurality of register entry fields of the PRF entry associated with the plurality of registers to a same physical register file entry number associated with a single destination register that is the source register of the instruction in the plurality of register entry fields of the PRF entry based on the fracture information.

2. The method of claim 1, wherein the source register is an architectural source register of the instruction, and
    wherein the method further comprises:
        determining that the data of the architectural source register is distributed across the plurality of registers recorded in the plurality of register entry fields of the PRF entry based on the fracture information; and
        determining that the architectural source register is fractured, in response to determining that the data of the architectural source register is distributed across the plurality of registers recorded in the plurality of register entry fields of the PRF entry.

3. The method of claim 2, wherein the fracture information is derived from first information of an architectural source tag indicating a type of the architectural source register and second information of the architectural source tag indicating whether the architectural source register is fractured.

4. The method of claim 3, wherein the first information indicates the type of the architectural source register is one of a single, double, or quad, and
    wherein the second information indicates the plurality of registers recorded in the plurality of register entry fields of the PRF entry are singles or doubles.

5. The method of claim 3, further comprising:
    generating at least one fix-up micro-op, in response to determining that the architectural source register is fractured; and
    injecting the at least one fix-up micro-op into an instruction pipeline to fix up the fractured architectural source register by reading the plurality of registers associated with different physical register file entry numbers among the physical register file entry numbers recorded in the plurality of register entry fields of the PRF entry and writing a result of the reading to the single destination register having a size larger than a size of each of the plurality of registers.

6. The method of claim 5, further comprising renaming the at least one fix-up micro-op.

7. The method of claim 5, further comprising determining a number of the at least one fix-up micro-op based on the first information and the second information.

8. The method of claim 2, further comprising stalling a micro-op which has not been renamed and scheduled for execution, in response to determining that the architectural source register is fractured.

9. The method of claim 8, further comprising, in response to determining that the architectural source register is fractured, fixing up the fracture by reading data of the plurality of registers associated with the different physical register file entry numbers among the physical register file entry numbers recorded in the plurality of register entry fields of the PRF entry and writing a result of the reading to the single destination register having a size larger than a size of each of the plurality of registers.

10. The method of claim 3, further comprising stalling a micro-op which has not been renamed and scheduled for execution, in response to determining that the architectural source register is fractured.

11. The method of claim 10, further comprising, in response to determining that the architectural source register is fractured, fixing up the fracture by reading data of the plurality of registers associated with the different physical register file entry numbers among the physical register file entry numbers recorded in the plurality of register entry fields of the PRF entry and writing a result of the reading to the single destination register having a size larger than a size of the plurality of registers.

12. An instruction processing apparatus comprising:
a renamer configured to store a rename table for renaming architectural registers of instructions to be executed to physical registers, the rename table comprising a rename table entry, and the rename table entry comprising a physical register file (PRF) entry of a plurality of register entry fields, to record in the plurality of register entry fields of the PRF entry, physical register file entry numbers of destination registers to which results of decoded instructions are written, to record, in the rename table, fracture information of a source register of an instruction, the fracture information comprising information indicating that data of the source register is distributed across a plurality of registers associated with different physical register file entry numbers among the physical register file entry numbers recorded in the plurality of register entry fields of the PRF entry, and to set the different physical register file entry numbers recorded in the plurality of register entry fields of the PRF entry associated with the plurality of registers to a same physical register file entry number associated with a single destination register that is the source register of the instruction in the plurality of register entry fields of the PRF entry based on the fracture information.

13. The apparatus of claim 12, wherein the source register is an architectural source register of the instruction, and the apparatus further comprises:
a fracture determiner which is configured to determine that the data of the architectural source register is distributed across the plurality of registers recorded in the plurality of register entry fields of the PRF entry based on the fracture information, and determine that the architectural source register is fractured, in response to determining that the data of the architectural source register is distributed across the plurality of registers recorded in the plurality of register entry fields of the PRF entry.

14. The apparatus of claim 13, the fracture information is derived from first information of an architectural source tag indicating a type of the architectural source register and second information of the architectural source tag indicating whether the architectural source register is fractured.

15. The apparatus of claim 14, wherein the first information indicates the type of the architectural source register is one of a single, double, or quad, and
wherein the second information indicates the plurality of registers recorded in the plurality of register entry fields of the PRF entry are singles or doubles.

16. The apparatus of claim 14, further comprising a fix-up state machine which is configured to:
generate at least one fix-up micro-op, in response to the fracture determiner determining that the architectural source register is fractured; and
inject the at least one fix-up micro-op into an instruction pipeline to fix up the fractured architectural source register by reading the plurality of registers associated with different physical register file entry numbers among the physical register file entry numbers recorded in the plurality of register entry fields of the PRF entry and writing a result of the reading to the single destination register having a size larger than a size of each the plurality of registers.

17. The apparatus of claim 16, wherein the renamer is further configured to rename the at least one fix-up micro-op.

18. The apparatus of claim 16, wherein the fix-up state machine is further configured to determine a number of the at least one fix-up micro-op based on the first information and the second information.

19. The apparatus of claim 13, further comprising a fix-up state machine configured to stall a micro-op which has not been renamed and scheduled for execution, in response to the fracture determiner determining that the architectural source register is fractured.

20. The apparatus of claim 19, wherein, in response to the fracture determiner determining that the architectural source register of the micro-op is fractured, the fix-up state machine is further configured to fix up the fracture by reading data of the plurality of registers associated with the different physical register file entry numbers among the physical register file entry numbers recorded in the plurality of register entry fields of the PRF entry and writing a result of the reading to the single destination register having a size larger than a size of each of the plurality of registers.

21. The apparatus of claim 14, further comprising a fix-up state machine configured to stall a micro-op which has not been renamed and scheduled for execution, in response to the fracture determiner determining that the architectural source register is fractured.

22. The apparatus of claim 21, wherein, in response to the fracture determiner determining that the architectural source register is fractured, the fix-up state machine is further configured to fix up the fracture by reading data of the plurality of registers associated with the different physical register file entry numbers among the physical register file entry numbers recorded in the plurality of register entry fields of the PRF entry and writing a result of the reading to the single destination register having a size larger than a size of the plurality of registers.

* * * * *